United States Patent
Takano et al.

(10) Patent No.: US 8,402,906 B2
(45) Date of Patent: Mar. 26, 2013

(54) DEVICE FOR REDUCING FRICTIONAL RESISTANCE OF SHIP BODY

(75) Inventors: Shinichi Takano, Nagasaki (JP); Shuji Mizokami, Tokyo (JP); Seijiro Higasa, Nagasaki (JP); Chiharu Kawakita, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 216 days.

(21) Appl. No.: 12/997,962

(22) PCT Filed: Feb. 18, 2009

(86) PCT No.: PCT/JP2009/052815
§ 371 (c)(1),
(2), (4) Date: Dec. 14, 2010

(87) PCT Pub. No.: WO2010/058613
PCT Pub. Date: May 27, 2010

(65) Prior Publication Data
US 2011/0094435 A1   Apr. 28, 2011

(30) Foreign Application Priority Data

Nov. 21, 2008 (JP) .................................. 2008-298729

(51) Int. Cl.
*B63B 1/38* (2006.01)
(52) U.S. Cl. ..................................... 114/67 A
(58) Field of Classification Search .................. 114/67 A
See application file for complete search history.

(56) References Cited

U.S. PATENT DOCUMENTS 3,628,488 A  12/1971  Gibson
6,145,459 A *  11/2000  Takahashi et al. ........... 114/67 A

FOREIGN PATENT DOCUMENTS

| EP | 0 903 287 | 3/1999 |
|---|---|---|
| EP | 903287 A2 * | 3/1999 |
| JP | 48-35557 | 10/1973 |
| JP | 11-227675 | 8/1999 |
| JP | 2004-114533 | 4/2004 |
| JP | 2007-21392 | 2/2007 |

(Continued)

OTHER PUBLICATIONS

Decision of a Patent Grant issued Mar. 6, 2012 in corresponding Japanese Patent Application No. 2008-298729 with English translation.
International Search Report issued May 26, 2009 in International (PCT) Application No. PCT/JP2009/052815.

(Continued)

*Primary Examiner* — Lars A Olson
*Assistant Examiner* — Anthony Wiest
(74) *Attorney, Agent, or Firm* — Wenderoth, Lind & Ponack, L.L.P.

(57) ABSTRACT

A ship-body frictional resistance reducing device for reducing frictional resistance of a sailing ship body by forming an air bubble curtain on a ship's bottom by generating air bubbles includes an air chamber provided on the ship's bottom inside the ship including an air supply port formed thereon, a plurality of air ejection holes formed in an array on the ship's bottom that serves as a bottom of the air chamber, and a diffusion plate provided inside the air chamber intervening between the air supply port and the air ejection holes. The diffusion plate is formed in a manner that it includes at least a supply-port facing area covering the air supply port and a pair of ejection-hole facing areas covering air ejection holes located at both edges of the air ejection holes in an arrangement direction.

4 Claims, 11 Drawing Sheets

FOREIGN PATENT DOCUMENTS

| | | |
|---|---|---|
| JP | 2008-114710 | 5/2008 |
| JP | 2008-143345 | 6/2008 |
| JP | 2008143345 A * | 6/2008 |
| JP | 2008-149209 | 7/2008 |
| JP | 2009-248611 | 10/2009 |

OTHER PUBLICATIONS

Written Opinion of the International Searching Authority issued May 26, 2009 in International (PCT) Application No. PCT/JP2009/052815 w/partial English translation.

* cited by examiner

POSITION OF EACH AIR EJECTION HOLE

POSITION OF EACH AIR EJECTION HOLE

BY OPENING RATIO ($\beta$) OF PERFORATED PLATE

DEVICE FOR REDUCING FRICTIONAL RESISTANCE OF SHIP BODY

BACKGROUND OF THE INVENTION

I. Technical Field

The present invention relates to a ship-body frictional resistance reducing device for reducing frictional resistance of a sailing ship body by forming an air bubble curtain on a ship's bottom by generating air bubbles from a plurality of air ejection holes formed on the ship's bottom.

II. Description of the Related Art

Conventionally, ship-body frictional resistance reducing devices include an air chamber formed inside a ship in a ship width direction on a bottom of a bow of the ship. In this air chamber of the ship-body frictional resistance reducing devices, a connection opening to which a high pressure air supply pipe is connected is formed on its top wall, and a ship's bottom outer plate portion corresponding to the air chamber is cut off to constitute a bottom opening without having a bottom plate. A baffle plate for receiving a high pressure air flow from the connection opening is installed inside the air chamber. By installing the baffle plate, a high pressure air filled in the air chamber is ejected to underwater from the bottom opening in a substantially uniform manner.

SUMMARY OF INVENTION

However, although the bottom of the air chamber constitutes a bottom opening that does not have a bottom plate in the conventional ship-body frictional resistance reducing device, there is typically a bottom plate on the bottom of the air chamber of the ship-body frictional resistance reducing device on which a larger number of air ejection holes are formed in an arrayed manner. If a baffle plate such as this conventional one is installed in such an air chamber, a flow rate of the air ejected from the large number of air ejection holes may not be uniform depending on a way to install the baffle plate.

The uniformity of the flow rate of the air ejected from the large number of air ejection holes is examined here with reference to FIG. 18 to FIG. 20, when a conventional baffle plate (a so-called diffusion plate) is installed in an air chamber formed with an array of a large number of air ejection holes on its bottom plate (a so-called air chamber). FIG. 18 is a perspective view schematically depicting an air chamber according to Japanese Patent Application Laid-open No. 2008-143345; FIG. 19 is a cross-sectional view of the air chamber described in Japanese Patent Application Laid-open No. 2008-143345 shown in FIG. 18 cut along a cut plane E; and FIG. 20 is a graph of a relation between a position of each of the air ejection holes and a flow rate of the air ejected from each of the air ejection holes in the air chamber according to Japanese Patent Application Laid-open No. 2008-143345. In the graph shown in FIG. 20, the vertical axis represents an air ejection amount and the horizontal axis represents the position of each of the air ejection holes.

As shown in FIGS. 18 and 19, an air chamber 200 is formed in a box shape of a rectangular cuboid, a large number of air ejection holes 201 are formed on a bottom portion of the air chamber 200 (that is, the ship's bottom) in an arrayed manner in a longitudinal direction of the air chamber 200, and an air supply port 202 is formed near the center of a top wall of the air chamber 200. A diffusion plate 205 that receives the air sent from the air supply port 202 is arranged in the air chamber 200. The diffusion plate 205 is arranged at a substantially same position as a position of the conventional baffle plate.

By supplying the air from the air supply port 202, a result in the graph of FIG. 19 was obtained. That is, the flow rate of the air ejected from the air ejection hole 202 positioned right below the diffusion plate 205 is decreased, and the flow rate of the air is increased with an increase of a distance from the diffusion plate 205.

From the result of the above examination, it has been found that installing the diffusion plate 205 at the substantially same position as the position of the conventional baffle plate in the air chamber 200 does not make it easy to have the flow rate of the air ejected from the large number of air ejection holes 201 uniform.

Accordingly, if the flow rate of the air is not uniform, it is difficult to make the thickness of the air bubble curtain formed on the ship's bottom uniform, making it difficult to fully achieve a reduction in the frictional resistance of the ship body.

Therefore, an object of the present invention is to provide a ship-body frictional resistance reducing device that can eject air in a uniform manner from a plurality of air ejection holes formed on a ship's bottom, on which an air chamber is installed.

According to an aspect of the present invention, a ship-body frictional resistance reducing device for reducing frictional resistance of a sailing ship body by forming an air bubble curtain on a ship's bottom by generating air bubbles, includes: an air chamber provided on the ship's bottom inside the ship, the air chamber including an air supply port formed thereon; a plurality of air ejection holes formed in an array on the ship's bottom that serves as a bottom of the air chamber; and a diffusion plate provided inside the air chamber, the diffusion plate intervening between the air supply port and the air ejection holes. The diffusion plate is formed in a manner that it includes at least a supply-port facing area covering the air supply port, and a pair of ejection-hole facing areas covering air ejection holes located at both edges of the air ejection holes in an arrangement direction.

Advantageously, in the ship-body frictional resistance reducing device, the diffusion plate is formed to be a rectangular plate and in a manner that it includes the supply-port facing area and a whole ejection-holes facing area covering all the air ejection holes arranged, and a diffusion opening extending in an arrangement direction in a continuous manner is formed between the diffusion plate and an inner wall of the air chamber inside the air chamber in which the diffusion plate is provided.

Advantageously, in the ship-body frictional resistance reducing device, four diffusion openings are formed between the diffusion plate and inner walls of the air chamber inside the air chamber in which the diffusion plate is provided.

Advantageously, in the ship-body frictional resistance reducing device, the diffusion plate includes a center rectangular plate formed in a manner that it includes the supply-port facing area, and a pair of side rectangular plates formed in a manner that they respectively include the pair of the ejection-hole facing areas, and a pair of diffusion openings is formed between the center rectangular plate and the pair of the side rectangular plates inside the air chamber in which the center rectangular plate and the pair of the side rectangular plates are provided.

According to the ship-body frictional resistance reducing device of an embodiment of the present invention, a diffusion plate can be formed in a manner that it includes at least a supply-port facing area and a pair of ejection-hole facing areas. Therefore, as the supplied air can hardly flows into air ejection holes at both edges in an arrangement direction of the air ejection holes, it is possible to flow the air into an air ejection hole located right below an air supply port. As a result, it is possible to make a flow rate of the air ejected from the air ejection holes uniform.

According to the ship-body frictional resistance reducing device of an embodiment of the present invention, by forming the diffusion plate in a rectangular plate shape, it is possible to make a structure of the diffusion plate simple, and at the same time, it is possible to perform an installation of the diffusion plate in an air chamber in a simple manner.

According to the ship-body frictional resistance reducing device of an embodiment of the present invention, by forming the diffusion plate in a cross-shaped plate, it is possible to take a wide center of the cross-shaped plate. Therefore, even if an opening diameter of the air supply port is increased to expand the supply-port facing area, it is possible to cover the opening diameter of the increased air supply port by arranging the center of the cross-shaped plate and the supply-port facing area to face each other.

According to the ship-body frictional resistance reducing device of an embodiment of the present invention, by forming the diffusion plate with a center rectangular plate and a pair of side rectangular plates, it is possible to make an ejection amount of the air ejected from the air ejection holes uniform in a preferred manner.

DETAILED DESCRIPTION OF THE INVENTION

Exemplary embodiments of a ship-body frictional resistance reducing device according to the present invention will be explained below in detail with reference to the accompanying drawings. The present invention is not limited to the embodiments. In addition, constituent elements in the following embodiments include those that can be easily replaceable by persons skilled in the art or that are substantially equivalent.

First Embodiment

Figure 1:
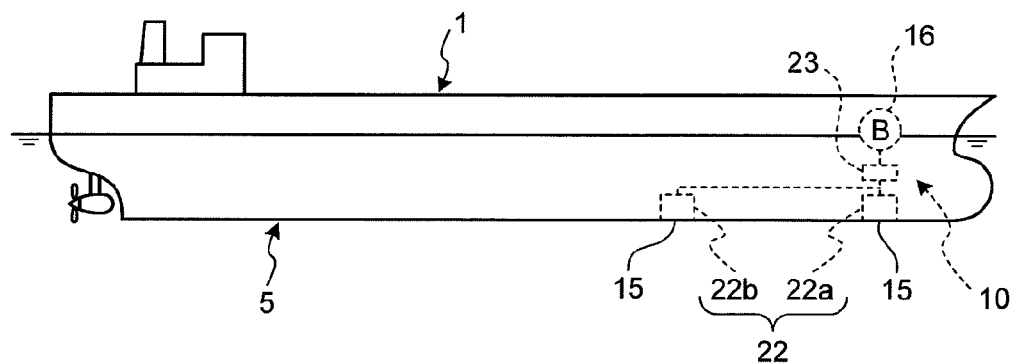
FIG. 1 is a side view schematically depicting a ship body having incorporated thereon a ship-body frictional resistance reducing device according to a first embodiment.
Figure 2:
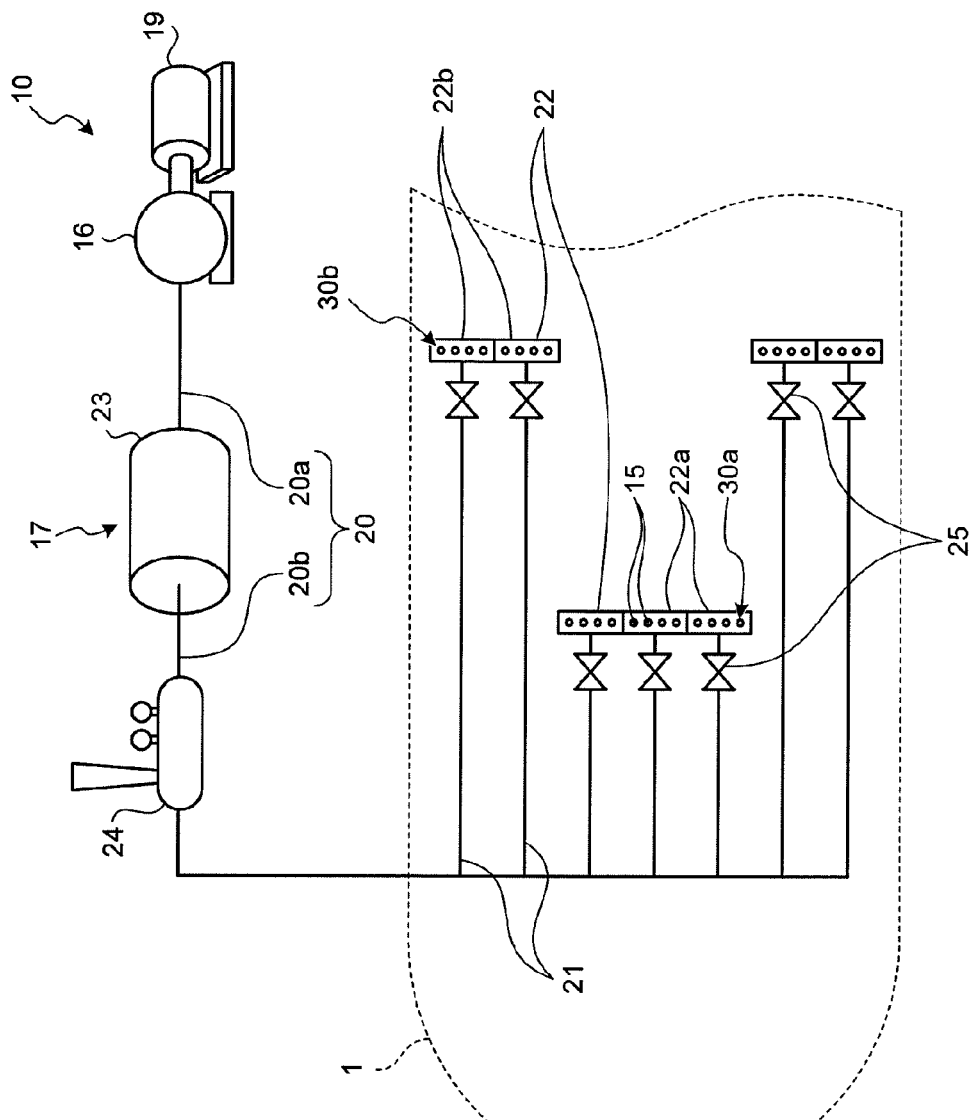
FIG. 2 is an explanatory diagram of a configuration of the ship-body frictional resistance reducing device according to the first embodiment.
Figure 3:
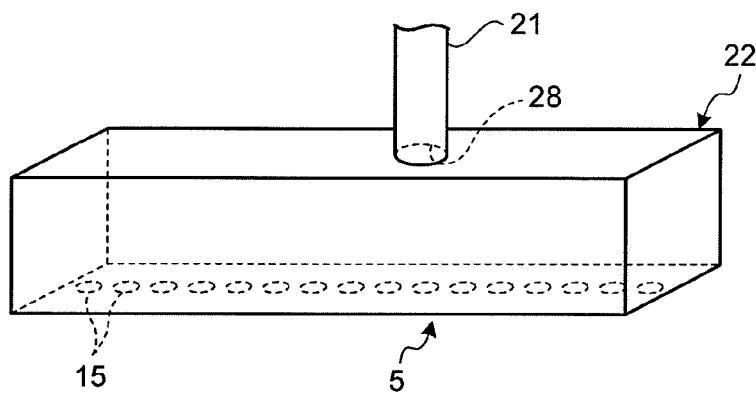
FIG. 3 is a perspective view schematically depicting a conventional air chamber without having a diffusion plate.
Figure 4:
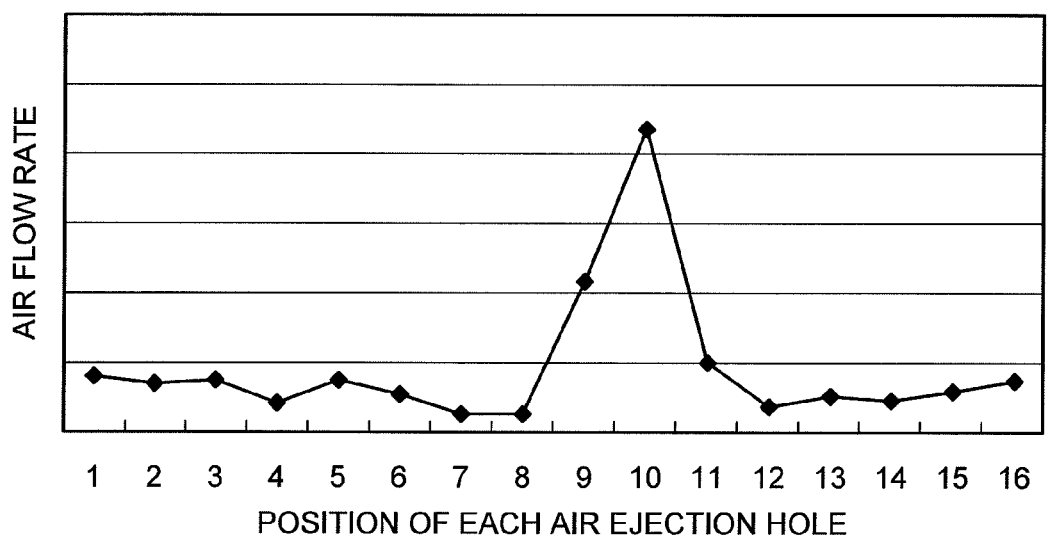
FIG. 4 is a graph of a relation between a position of each air ejection hole and a flow rate of the air ejected from each air ejection hole in the conventional air chamber.
Figure 5:
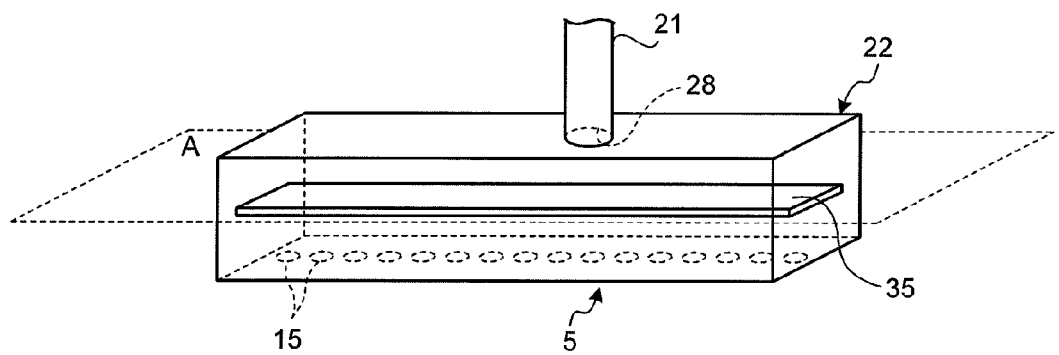
FIG. 5 is a perspective view schematically depicting an air chamber of the ship-body frictional resistance reducing device according to the first embodiment.
Figure 6:
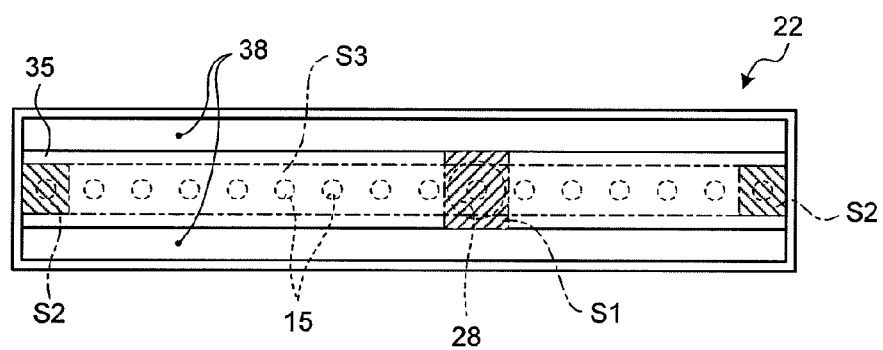
FIG. 6 is a cross-sectional view of the air chamber according to the first embodiment shown in FIG. 5 cut along a cut plane A.
Figure 7:
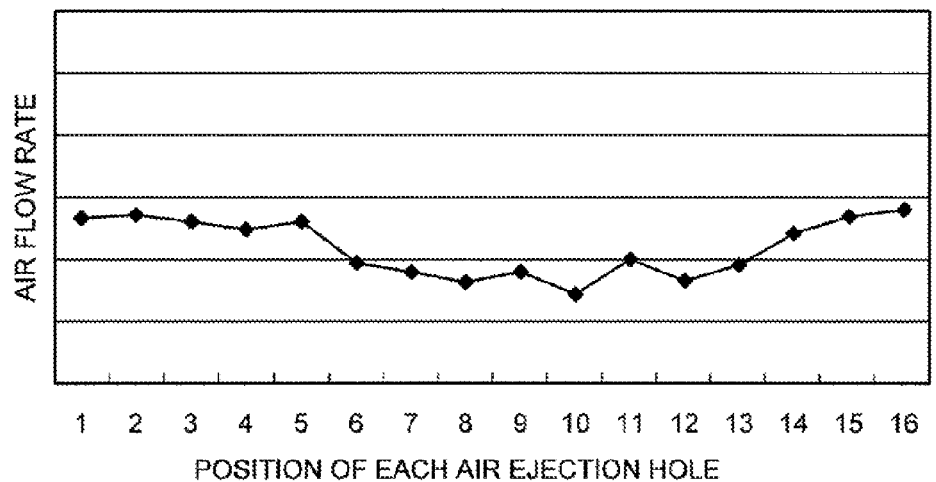
FIG. 7 is a graph of a relation between a position of each air ejection hole and a flow rate of the air ejected from each air ejection hole in the air chamber according to the first embodiment.

FIG. 1 is a side view schematically depicting a ship body having incorporated thereon a ship-body frictional resistance reducing device according to a first embodiment, and FIG. 2 is an explanatory diagram of a configuration of the ship-body frictional resistance reducing device according to the first embodiment. FIG. 3 is a perspective view schematically depicting a conventional air chamber without having a diffusion plate, and FIG. 4 is a graph of a relation between a position of each air ejection hole and a flow rate of the air ejected from each air ejection hole in the conventional air chamber. FIG. 5 is a perspective view schematically depicting the air chamber of the ship-body frictional resistance reducing device according to the first embodiment, and FIG. 6 is a cross-sectional view of the air chamber according to the first embodiment shown in FIG. 5 cut along a cut plane A. FIG. 7 is a graph of a relation between a position of each air ejection hole and a flow rate of the air ejected from each air ejection hole in the air chamber according to the first embodiment.

A ship-body frictional resistance reducing device 10 according to the first embodiment reduces the frictional resistance of a sailing ship body 1 by forming an air bubble curtain on a ship's bottom 5 by generating air bubbles from a plurality of air ejection holes 15 formed on the ship's bottom 5. As shown in FIG. 1, the ship body 1 having incorporated thereon the ship-body frictional resistance reducing device 10 is, for example, a flat-bottomed ship in which the ship's bottom 5 is flat, and the ship-body frictional resistance reducing device 10 is arranged on a bow side of the ship body 1. The ship-body frictional resistance reducing device 10 is not limited to be applied to the flat-bottomed ship, but also can be applied to other types of ships.

The ship-body frictional resistance reducing device 10 is explained with reference to FIG. 1 and FIG. 2. The ship-body frictional resistance reducing device 10 includes a large number of the air ejection holes 15 formed on the ship's bottom 5, a blower 16 that can supply the air to the large number of the air ejection holes 15, and an air supply path 17 that connects the blower 16 and the large number of the air ejection holes 15.

The large number of the air ejection holes constitute air-ejection hole groups 30a, 30b, and 30b arranged in a ship width direction of the ship body 1. The air-ejection hole groups 30a, 30b, and 30b are formed on the ship's bottom 5 more than one (for example, three in the first embodiment). One of the three air-ejection hole groups 30a, 30b, and 30b is the center air-ejection hole group 30a formed at the center of the bow side in the ship width direction, and the rest two make a pair of side air-ejection hole groups 30b and 30b formed at both sides of the center air-ejection hole group 30a on a stern side from the center air-ejection hole group 30a. Specifically, the center air-ejection hole group 30a is arranged on the bow side of the ship body 1, and the pair of the side air-ejection hole groups 30b and 30b are formed near a center of the ship body 1.

The blower 16 is arranged on the bow side of the ship body 1, functioning as an air supply source that can supply the air to the large number of the air ejection holes 15. An electric motor 19 is employed as a driving source for the blower 16, and an amount of supplying the air sent from the blower 16 can be controlled by controlling a rotation speed of the electric motor 19. A distance between the blower 16 and the center air-ejection hole group 30a is shorter than a distance between the blower 16 and the side air-ejection hole groups 30b and 30b, so that both the blower 16 and the center air-ejection hole group 30a are arranged on the bow side of the ship body 1. The air supply source is not limited to the blower 16, but can be an air compressor or the like. Furthermore, although the air supply source is configured with a single unit of the blower 16 in the first embodiment, the air supply source is not limited to this configuration, but also can be configured with a plurality of blowers 16.

The air supply path 17 includes a main supply pipe 20 of which one end is connected to the blower 16, a plurality of branch supply pipes 21 connected to the main supply pipe 20, and a plurality of air chambers 22 respectively connected to the branch supply pipes 21. A primary air tank 23 is provided on the main supply pipe 20. That is, the main supply pipe 20 is configured with an upstream-side main supply pipe 20a connecting the blower 16 and the primary air tank 23 and a downstream-side main supply pipe 20b connecting the primary air tank 23 and the branch supply pipes 21. An air flow meter 24 for measuring a flow rate of the air flowing through the downstream-side main supply pipe 20b is provided on the downstream-side main supply pipe 20b. An on-off valve 25 for opening and closing a pipe is provided on each of the branch supply pipes 21.

The primary air tank 23 is configured to be able to store the air supplied from the blower 16 via the upstream-side main supply pipe 20a. By providing the primary air tank 23 on the main supply pipe 20, it is possible to cope with a pressure change of the air (a so-called pulsation of the air) generated at the blower 16 and the upstream-side main supply pipe 20a.

The air chambers 22 are formed in a box shape of a rectangular cuboid, being arranged corresponding to the air ejection holes 15 formed on the ship's bottom 5. That is, the air ejection holes 15 are formed on a bottom surface of each of the air chambers 22 (that is, the ship's bottom). Furthermore, an air supply port 28 to which each of the branch supply pipes 21 is connected is formed substantially at a center portion of a top wall surface of each of the air chambers 22 (see FIG. 5). The air chambers 22 are configured with a plurality of center air chambers 22a corresponding to the center air-ejection hole group 30a and a plurality of side air chambers 22b corresponding to the pair of the side air-ejection hole groups 30b and 30b.

The center air chambers 22a are formed in a box shape of a rectangular cuboid with its longitudinal direction aligned with the ship width direction, being arranged in the ship width direction. By supplying the air from the blower 16 to the center air chambers 22a, the air is ejected from the center air-ejection hole group 30a to generate the air bubbles.

The side air chambers 22b are, in the same manner as the center air chambers 22a, formed in a box shape of a rectangular cuboid with its longitudinal direction aligned with the ship width direction, being arranged in the ship width direction. The side air chambers 22b are divided into two portions corresponding to a pair of side air ejection holes 15. By supplying the air from the blower 16 to each of the divided side air chambers 22b, the air is ejected from the side air-ejection hole groups 30b and 30b to generate the air bubbles.

The air flow meter 24 measures, as described above, the flow rate of the air flowing through the downstream-side main supply pipe 20b. Based on a result of measurement of the air flow meter 24, an amount of supplying the air supplied from the blower 16 is controlled.

A plurality of on-off valves 25 respectively provided on the branch supply pipes 21 functions as a so-called check valve, which is installed for preventing an infiltration of seawater into the air supply path 17 on the upstream side from the on-off valves 25. Specifically, when an operation of the ship-body frictional resistance reducing device 10 is stopped, that is, when the driving of the blower 16 is stopped, the ejection of the air from each of the air ejection holes 15 is stopped. This causes the seawater to flow into each of the air chambers 22 via each of the air ejection holes 15. At this time, because each of the air chambers 22 interlocks with each of the branch supply pipes 21, the infiltration of the seawater into each of the branch supply pipes 21 on the upstream side from the on-off valves 25 is prevented by closing the on-off valves 25.

Therefore, when the blower 16 is driven, the air blown out from the blower 16 flows into the primary air tank 23 through the upstream-side main supply pipe 20a, and thereafter, the air flows into each of the air chambers 22 via the downstream-side main supply pipe 20b and the branch supply pipes 21. At this time, the amount of supplying the air from the blower 16 is adjusted by controlling the electric motor 19 based on the result of measurement of the air flow meter 24. When the air flows into each of the air chambers 22, it is ejected to underwater through each of the air ejection holes 15 to generate the air bubbles from the ship's bottom 5.

Figure 18:
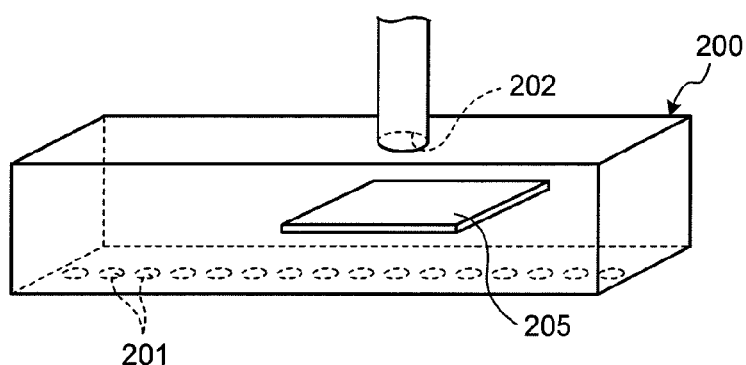
FIG. 18 is a perspective view schematically depicting an air chamber according to Japanese Patent Application Laid-open No. 2008-143345.
Figure 19:
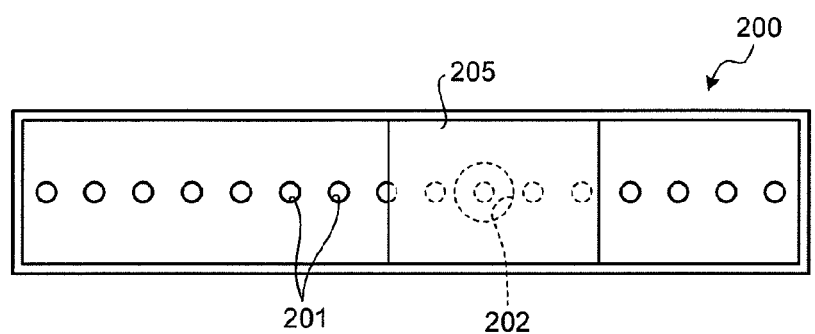
FIG. 19 is a cross-sectional view of the air chamber described in Japanese Patent Application Laid-open No. 2008-143345 shown in FIG. 18 cut along a cut plane E.

The air chambers 22, which are characteristic parts of the present invention, are explained below. As described above, the air ejection holes 15 are formed in an array in the ship width direction on the ship's bottom 5 corresponding to each of the air chambers 22 provided on the bottom of the ship body 1. As shown in FIG. 18 and FIG. 19, installing the diffusion plate 205 at the substantially same position as the position of the baffle plate described in Patent Document 1 cannot make it easy to have the flow rate of the air ejected from the air ejection holes 201 uniform, which is as indicated by the graph shown in FIG. 20.

In the ship-body frictional resistance reducing device 10 according to the first embodiment, as shown in FIG. 5 and FIG. 6, a rectangular diffusion plate 35 is provided in each of the air chambers 22. The diffusion plate 35 is explained below. A longitudinal direction of the diffusion plate 35 that is formed in a rectangular shape is the ship width direction, which is the same direction as the longitudinal direction of each of the air chambers 22. The diffusion plate 35 is installed in parallel with the ship's bottom 5.

Furthermore, the diffusion plate 35 is installed in opposite to the air supply port 28 formed on the air chamber 22, covering all the air ejection holes 15 provided. That is, the diffusion plate 35 is formed in a manner that it includes a supply-port facing area S1 covering the air supply port 28 and a whole ejection-holes facing area S3 covering all the air ejection holes 15. The whole ejection-holes facing area S3 includes a pair of ejection-hole facing areas S2 and S2 covering the air ejection holes 15 located at both edges of the air ejection holes 15 in the ship width direction (the arrangement direction).

Both edges of the diffusion plate 35 in the ship width direction are mounted on an inner wall of the air chamber 22, and both edges of the diffusion plate 35 in a ship length direction are free ends. Therefore, in the ship length direction, a pair of slit openings 38 and 38 (diffusion openings) extending in the ship width direction are formed between both inner walls of the air chamber 22 and the diffusion plate 35. Because the diffusion plate 35 can be mounted by simply mounting the both edges in the ship width direction on the inner wall of the air chamber 22, a process of mounting the diffusion plate 35 can be easily performed. In addition, because the diffusion plate 35 is in a rectangular shape, a structure of the diffusion plate 35 itself can be made simple.

Therefore, the air supplied through the air supply port 28 flows along the diffusion plate 35 by being blown against the diffusion plate 35, and thereafter, flows toward each of the air ejection holes 15 through the pair of the slit openings 38 and 38. As a result, the flow rate of the air ejected from the air ejection holes 15 becomes as indicated by the graph shown in FIG. 7.

The uniformity of the flow rate of the air ejected from the air ejection holes 15 through the air chamber 22 without having the diffusion plate 35 installed is examined with reference to FIG. 3 and FIG. 4. The graph shown in FIG. 4 and the graph shown in FIG. 7 are compared with each other, and the graph shown in FIG. 20 and the graph shown in FIG. 7 are compared with each other.

As shown in FIG. 3, the air chamber 22 is a conventional air chamber 22 without having the diffusion plate 35 installed, and its structure is the same as that of the air chamber described in the first embodiment. Therefore, explanations of the air chamber 22 shown in FIG. 3 are omitted. When the air is supplied to such an air chamber 22 through the air supply port 28, the flow rate of the air ejected from the air ejection holes 15 is not uniform as shown in FIG. 4.

Specifically explaining with reference to FIG. 4, the vertical axis of the graph represents the flow rate of the air, and the horizontal axis represents a position of each of the air ejection holes 15. That is, the horizontal axis represents a sequential numbering of the air ejection holes 15 from an air ejection hole 15 at one edge to an air ejection hole 15 at the other edge in the ship width direction. The tenth air ejection hole 15 on the horizontal axis is the air ejection hole located right below the air supply port 28.

In the graph shown in FIG. 4, the flow rate of the air ejected from the tenth air ejection hole 15 indicates a peak, and the flow rate of the ejected air decreases toward the air ejection holes 15 at both edges. Therefore, with the air chamber 22 shown in FIG. 3, it is not possible to make the air ejected from the air ejection holes 15 uniform.

Comparing the graph shown in FIG. 4 with the graph shown in FIG. 7, the flow rate of the air ejected from the air ejection hole 15 located right below the air supply port 28 is decreased in the graph shown in FIG. 7 than in the graph shown in FIG. 4, and the flow rate of the ejected air is increased toward the air ejection holes 15 at the both edges in the ship width direction. That is, the graph shown in FIG. 7 shows the flow rate of the air more uniform than that of the graph shown in FIG. 4.

Figure 20:
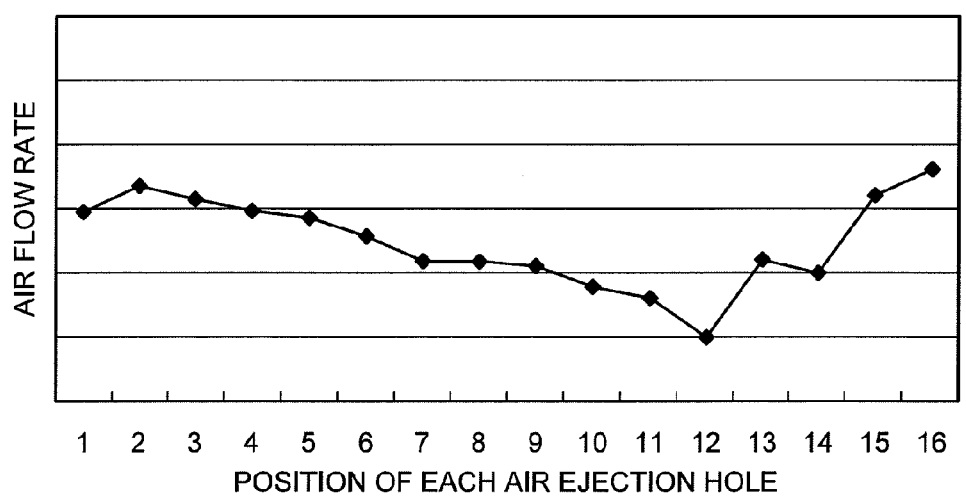
FIG. 20 is a graph of a relation between a position of each air ejection hole and a flow rate of the air ejected from each air ejection hole in the air chamber according to Japanese Patent Application Laid-open No. 2008-143345.

On the other hand, comparing the graph shown in FIG. 7 with the graph shown in FIG. 20, the flow rate of the air ejected from the air ejection hole 15 located right below the air supply port 28 is increased in the graph shown in FIG. 7 than in the graph shown in FIG. 20, and the flow rate of the ejected air is decreased toward the air ejection holes 15 at the both edges in the ship width direction. That is, the graph shown in FIG. 7 shows the flow rate of the air more uniform than that of the graph shown in FIG. 20.

With the above configuration, it is possible to form the pair of the slit openings 38 and 38 between both inner walls of the air chamber 22 and the diffusion plate 35 by setting the longitudinal direction of the rectangular diffusion plate 35 to the same direction as the arrangement direction of the air ejection holes 15, arranging the diffusion plate 35 and the air ejection holes 15 to face each other, and arranging the diffusion plate 35 and the air supply port 28 to face each other. By this arrangement, it is possible to make the flow rate of the air ejected from the air ejection holes 15 substantially uniform by supplying the air supplied through the air supply port 28 to toward the air ejection holes 15 through the pair of the slit openings 38 and 38. As a result, because it becomes easy to make a thickness of the air bubble curtain formed on the ship's bottom 5 uniform, it is possible to fully bring out the effect of reducing the frictional resistance of the ship body 1.

Furthermore, because the diffusion plate 35 is formed in a rectangular plate shape, it is possible to make the structure of the diffusion plate 35 simple, and at the same time, it is possible to perform the installation of the diffusion plate 35 in the air chamber 22 in a simple manner.

Second Embodiment

Figure 8:
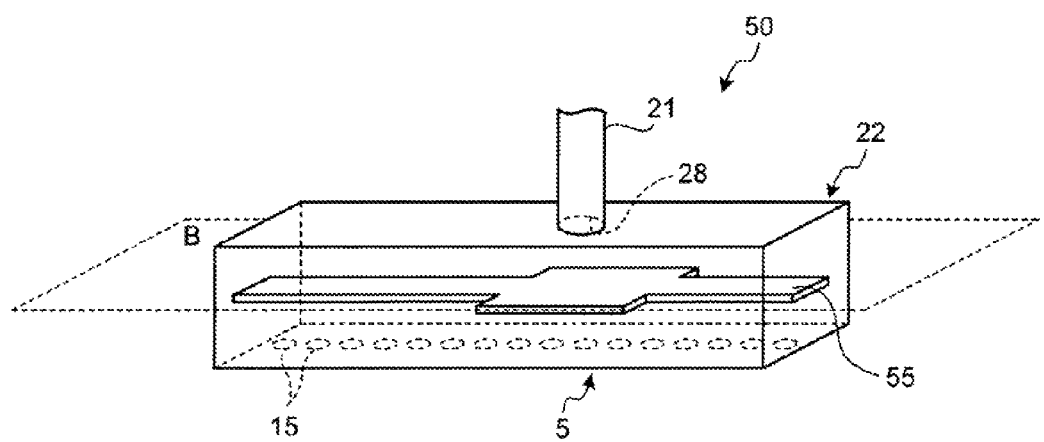
FIG. 8 is a perspective view schematically depicting an air chamber of a ship-body frictional resistance reducing device according to a second embodiment.
Figure 9:
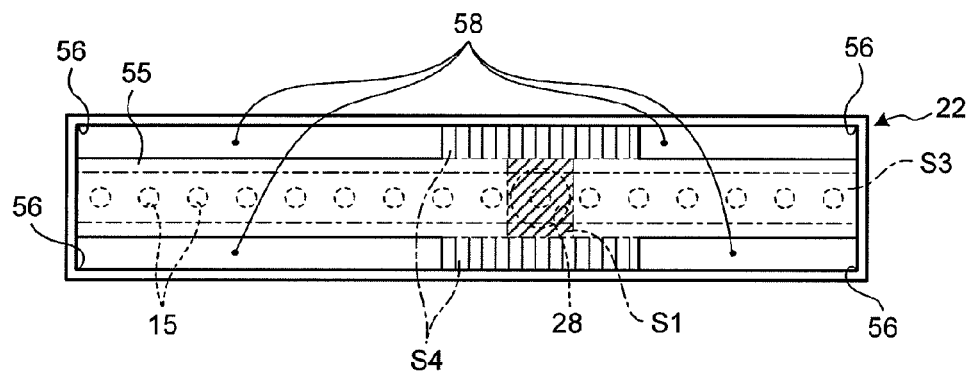
FIG. 9 is a cross-sectional view of the air chamber according to the second embodiment shown in FIG. 8 cut along a cut plane B.
Figure 10:
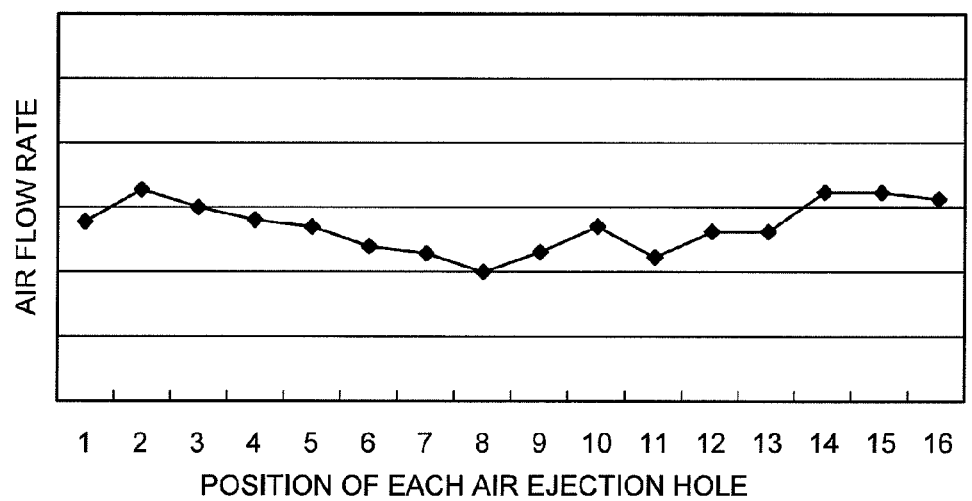
FIG. 10 is a graph of a relation between a position of each air ejection hole and a flow rate of the air ejected from each air ejection hole in the air chamber according to the second embodiment.

A ship-body frictional resistance reducing device 50 according to a second embodiment is explained with reference to FIG. 8 to FIG. 10. To avoid redundant explanations, only parts that differ from above explanations are explained. FIG. 8 is a perspective view schematically depicting an air chamber of a ship-body frictional resistance reducing device according to the second embodiment; FIG. 9 is a cross-sectional view of the air chamber according to the second embodiment shown in FIG. 8 cut along a cut plane B; and FIG. 10 is a graph of a relation between a position of each air ejection hole and a flow rate of the air ejected from each air ejection hole in the air chamber according to the second embodiment. In the ship-body frictional resistance reducing device 50 according to the second embodiment, a diffusion plate 55 provided in its air chamber 22 is formed in a cross-shaped plate.

Specifically, the diffusion plate 55 that is formed in a cross shape is configured in a manner that a rectangular plate having its longitudinal direction in the ship width direction intersects with a rectangular plate having its short direction in the ship length direction, being arranged in parallel to the ship's bottom 5. That is, the diffusion plate 55 has such a structure as a combination of the diffusion plate 205 shown in FIG. 19 and the diffusion plate 35 shown in FIG. 6.

In addition, the diffusion plate 55 is installed in a manner that a center of its crossed portion faces the air supply port 28 and the diffusion plate 55 covers all the air ejection holes 15. That is, the diffusion plate 55 is formed in a manner that it includes the supply-port facing area S1 facing the air supply port 28 and the whole ejection-holes facing area S3 facing all the air ejection holes 15. In addition, the diffusion plate 55 is formed in a manner that it further includes a center area S4 at the center of the pair of the slit openings 38 and 38 in the first embodiment in the ship width direction.

Both edges of the diffusion plate 55 in the ship width direction are mounted on the inner wall of the air chamber 22, and both edges of the diffusion plate 55 in the ship length direction are also mounted on the inner wall of the air chamber 22. Therefore, four slit openings 58, 58, 58, and 58 (diffusion openings) are formed between inner wall corners 56 and the diffusion plate 55, with each of the slit openings formed in a manner that it extends in the ship width direction.

Therefore, the air supplied through the air supply port 28 flows along the diffusion plate 55 by being blown against the diffusion plate 55, and thereafter, flows toward each of the air ejection holes 15 through the slit openings 58, 58, 58, and 58. As a result, the flow rate of the air ejected from the air ejection holes 15 becomes as indicated by the graph shown in FIG. 10. That is, in the graph shown in FIG. 10, the flow rate of the air is more uniform than that in the graph shown in FIG. 4, and is also more uniform than that in the graph shown in FIG. 20.

Also with the above configuration, it is possible to form the four slit openings 58, 58, 58, and 58 between the inner wall corners 56 of the air chamber 22 and the diffusion plate 55 by arranging the cross-shaped diffusion plate 55 and all the air ejection holes 15 to face each other and arranging the diffusion plate 55 and the air supply port 28 to face each other. By doing this, it is possible to make the flow rate of the air ejected from the air ejection holes 15 substantially uniform by supplying the air supplied through the air supply port 28 to toward the air ejection holes 15 through the four slit openings 58, 58, 58, and 58. Although the diffusion plate 55 is formed in a cross shape and each of the slit openings 58 is formed in a rectangular shape in the second embodiment, for example, the slit openings 58 can be formed in a triangular shape, and the diffusion plate 55 can be formed in a rhombic shape or an octagon shape.

Third Embodiment

Figure 11:
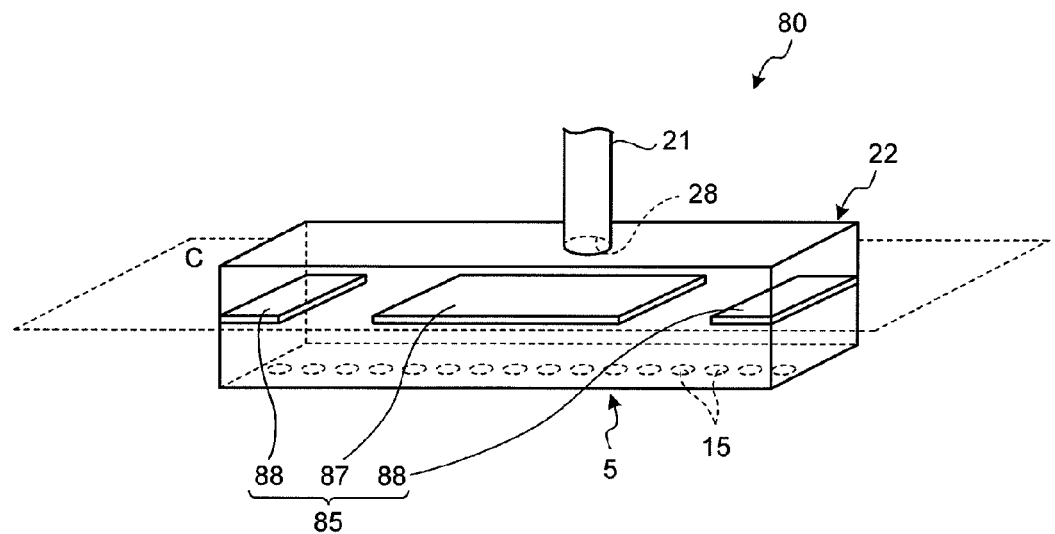
FIG. 11 is a perspective view schematically depicting an air chamber of a ship-body frictional resistance reducing device according to a third embodiment.
Figure 12:
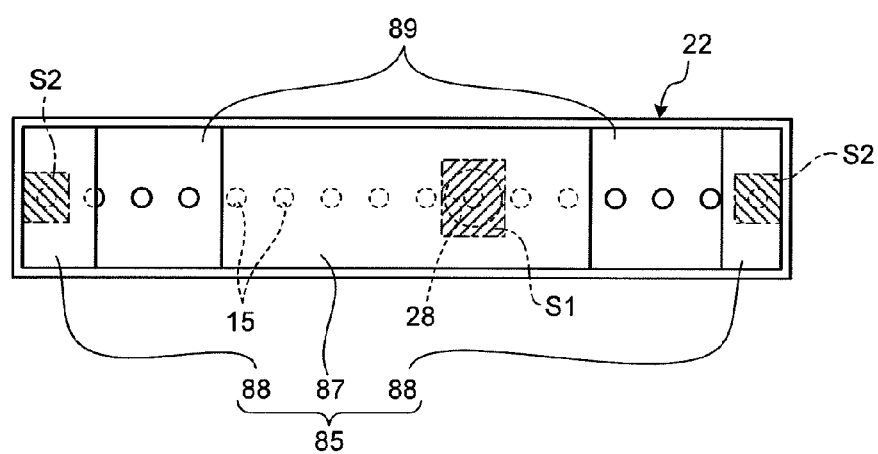
FIG. 12 is a cross-sectional view of the air chamber according to the third embodiment shown in FIG. 11 cut along a cut plane C.
Figure 13:
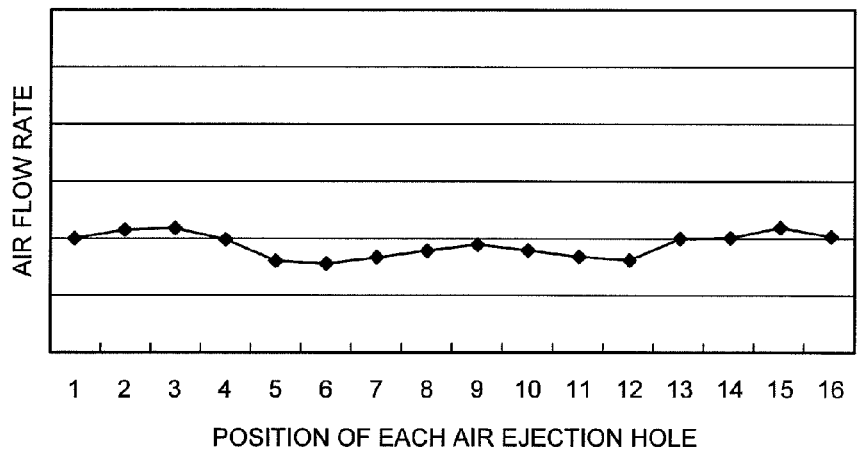
FIG. 13 is a graph of a relation between a position of each air ejection hole and a flow rate of the air ejected from each air ejection hole in the air chamber according to the third embodiment.

A ship-body frictional resistance reducing device 80 according to a third embodiment is explained with reference to FIG. 11 to FIG. 13. Also in this case, to avoid redundant explanations, only parts that differ from above explanations are explained. FIG. 11 is a perspective view schematically depicting an air chamber of the ship-body frictional resistance reducing device according to the third embodiment; FIG. 12 is a cross-sectional view of the air chamber according to the third embodiment shown in FIG. 11 cut along a cut plane C; and FIG. 12 is a graph of a relation between a position of each air ejection hole and a flow rate of the air ejected from each air ejection hole in the air chamber according to the third embodiment. In the ship-body frictional resistance reducing device 80 according to the third embodiment, a diffusion plate 85 provided in the air chamber 22 is constituted by a center rectangular plate 87 formed in a manner that it includes the supply-port facing area S1 and a pair of side rectangular plates 88 and 88 formed in a manner that it includes the pair of the ejection-hole facing areas S2 and S2.

Specifically, the center rectangular plate 87 is formed in a rectangular plate shape with its longitudinal direction in the ship width direction, being arranged to face the air supply port 28 and to be in parallel to the ship's bottom 5. Both edges of the center rectangular plate 87 in the ship width direction are free ends, and both edges of the center rectangular plate 87 in the ship length direction are mounted on the inner wall of the air chamber 22.

On the other hand, each of the pair of the side rectangular plates 88 and 88 is formed in a rectangular plate shape with its longitudinal direction in the ship length direction, being arranged to face each of a pair of the air ejection holes at both sides in the ship width direction from among the air ejection holes provided and to be in parallel to the ship's bottom 5. One of both edges of each of the side rectangular plates 88 and 88 in the ship width direction is mounted on the inner wall of the air chamber while the other of the both edges is a free end, and both edges of each of the side rectangular plates 88 and 88 in the ship length direction are mounted on the inner wall of the air chamber 22.

The center rectangular plate 87 and the pair of the side rectangular plates 88 and 88 are arranged in the same plane. Therefore, a pair of diffusion openings 89 and 89 is formed between the center rectangular plate 87 and the pair of the side rectangular plates 88 and 88. That is, the diffusion plate 85 is configured in a manner that the pair of the side rectangular plates 88 and 88 is respectively arranged at the both edges of the center rectangular plate 87 in the ship width direction via the pair of the diffusion openings 89 and 89.

Therefore, the air supplied through the air supply port 28 flows along the center rectangular plate 87 by being blown against the center rectangular plate 87, and thereafter, flows toward each of the air ejection holes 15 through the pair of the diffusion openings 89 and 89. As a result, the flow rate of the air ejected from the air ejection holes 15 becomes as indicated by the graph shown in FIG. 13. That is, the graph shown in FIG. 13 shows the flow rate of the air more uniform than that of the graph shown in FIG. 4, and is also more uniform than that in the graph shown in FIG. 20.

Also with the above configuration, it is possible to form the diffusion openings 89 and 89 between the center rectangular plate 87 and the pair of the side rectangular plates 88 and 88 by arranging the center rectangular plate 87 and the air supply port 28 to face each other and arranging the pair of the side rectangular plates 88 and 88 and the air ejection holes 15 at the both edges in the arrangement direction to face each other. By doing this, it is possible to make the flow rate of the air ejected from the air ejection holes 15 substantially uniform by supplying the air supplied through the air supply port 28 to toward the air ejection holes 15 through the pair of the diffusion openings 89 and 89.

Although the center rectangular plate 87 and the pair of the side rectangular plates 88 and 88 are arranged in the same plane in the third embodiment, the center rectangular plate 87 and the pair of the side rectangular plates 88 and 88 can be arranged with a shift from each other in the vertical direction perpendicular to the same plane.

Fourth Embodiment

Figure 14:
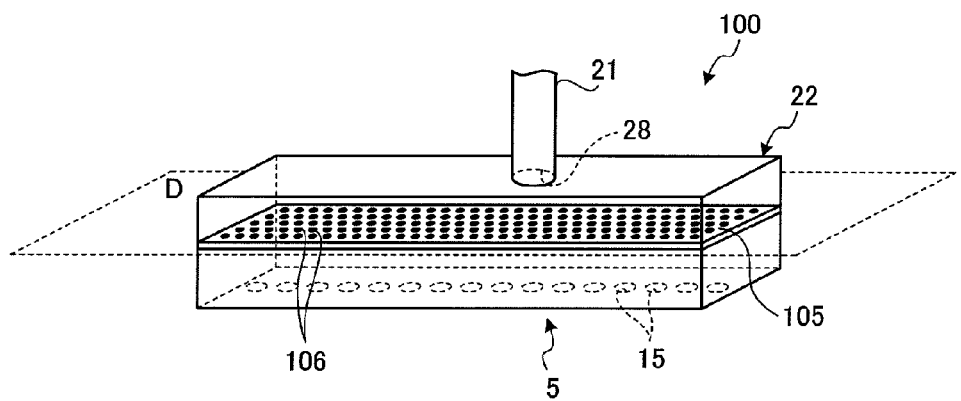
FIG. 14 is a perspective view schematically depicting an air chamber of a ship-body frictional resistance reducing device according to a fourth embodiment.
Figure 15:
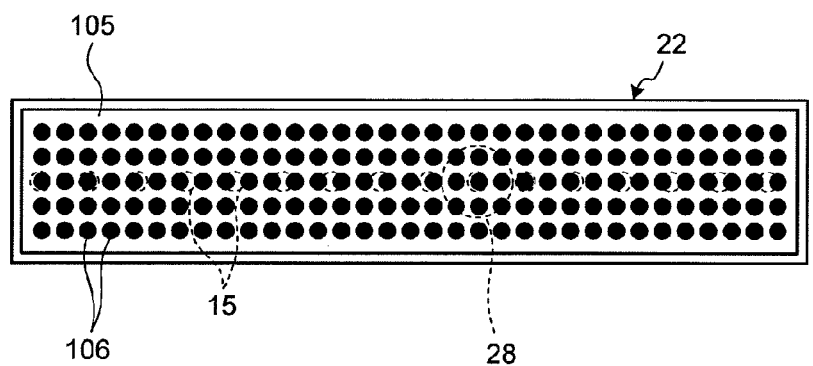
FIG. 15 is a cross-sectional view of the air chamber according to the fourth embodiment shown in FIG. 14 cut along a cut plane D.
Figure 16:
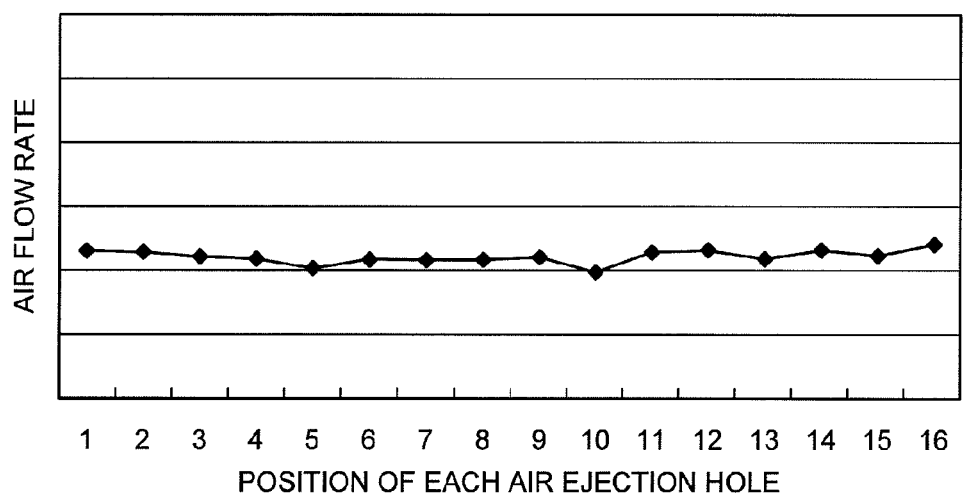
FIG. 16 is a graph of a relation between a position of each air ejection hole and a flow rate of the air ejected from each air ejection hole in the air chamber according to the fourth embodiment.
Figure 17:
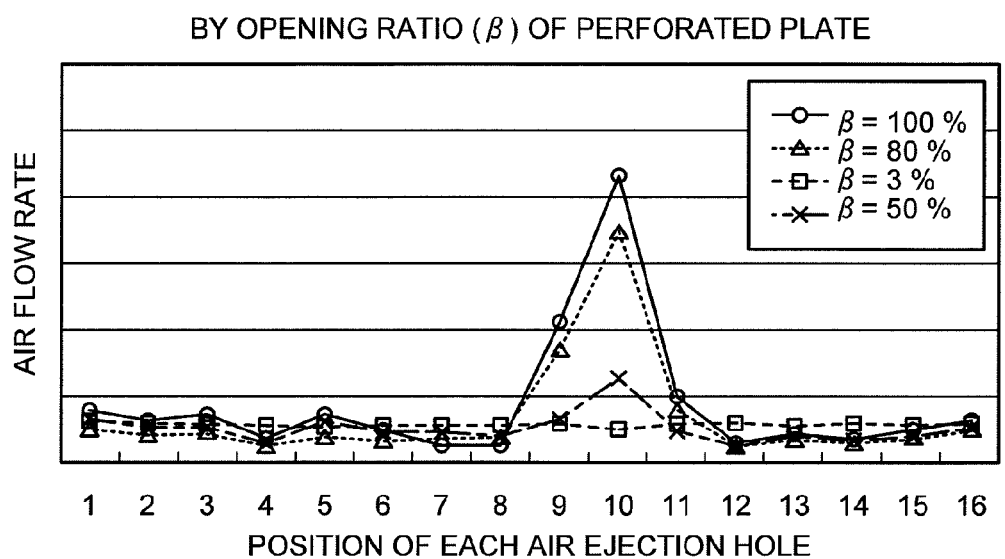
FIG. 17 is a graph of the relation between the position of each air ejection hole and the flow rate of the air ejected from each air ejection hole in the air chamber according to the fourth embodiment when an opening ratio of a perforated plate is changed.

A ship-body frictional resistance reducing device 100 according to a fourth embodiment is explained with reference to FIG. 14 to FIG. 17. Also in this case, to avoid redundant explanations, only parts that differ from above explanations are explained. FIG. 14 is a perspective view schematically depicting an air chamber of the ship-body frictional resistance reducing device according to a fourth embodiment; FIG. 15 is a cross-sectional view of the air chamber according to the fourth embodiment shown in FIG. 14 cut along a cut plane D; and FIG. 16 is a graph of a relation between a position of each air ejection hole and a flow rate of the air ejected from each air ejection hole in the air chamber according to the fourth embodiment. FIG. 17 is a graph of the relation between the position of each air ejection hole and the flow rate of the air ejected from each air ejection hole in the air chamber according to the fourth embodiment when an opening ratio of a perforated plate is changed. In the ship-body frictional resistance reducing device 100, a diffusion plate 105 provided in the air chamber 22 is formed with a perforated plate.

Specifically, the diffusion plate 105 is formed in a rectangular plate shape, with a large number of through holes 106 formed on its surface, being arranged in parallel to the ship's bottom 5. Furthermore, the diffusion plate 105 is arranged to face the air supply port 28 and to face all the air ejection holes 15 provided. Both edges of the diffusion plate 105 in the ship width direction are mounted on the inner wall of the air chamber 22, and both edges in the ship length direction are also mounted on the inner wall of the air chamber 22. That is, the diffusion plate 105 is arranged in a manner that an inside of the air chamber 22 is divided into two layers in the vertical direction.

Therefore, a part of the air supplied through the air supply port 28 flows along the diffusion plate 105 by being blown against the diffusion plate 105, and the other part of the air flows toward each of the air ejection holes 15 through each of the through holes 106. As a result, the flow rate of the air ejected from the air ejection holes 15 becomes as indicated by the graph shown in FIG. 16. That is, in the graph shown in FIG. 16, the flow rate of the air is more uniform than that in the graph shown in FIG. 4, and is also more uniform than that in the graph shown in FIG. 20. In addition, as can be understood from the graph shown in FIG. 17, when the opening ratio of the diffusion plate 105 that works as a perforated plate is changed, it is preferable to use a perforated plate with the opening ratio in a range from 3% to 50%.

Also with the above configuration, it is possible to supply the air toward the air ejection holes 15 through the through holes 106 by setting the diffusion plate 105 of the perforated plate and the air supply port 28 and all the air ejection holes 15 to face each other. By doing this, it is possible to make the flow rate of the air ejected from the air ejection holes 15 substantially uniform by supplying the air supplied through the air supply port 28 to toward the air ejection holes 15 through the through holes 106.

Although not shown in the drawings, as a modification example, by forming the diffusion plate in a hollow half circle shape and forming the through holes on a surface of the diffusion plate, a circular opening portion of the diffusion plate can be arranged to face the air supply port 28. That is, this diffusion plate is configured with a parabolic-shaped perforated plate of a bowl shape. With this configuration, the air supplied through the air supply port 28 is supplied in a parabolic shape in the air chamber 22 by passing through the through holes of the diffusion plate. As a result, it is possible to make the flow rate of the air ejected from the air ejection holes 15 substantially uniform. In addition, although only one of the diffusion plate 105 of the perforated plate is arranged in the fourth embodiment, a plurality of diffusion plates 105 can be arranged in the vertical direction in a repeated manner. With this configuration, it is possible to build a spatial air diffusion route by dividing the inside of the air chamber 22 in a tomographic manner with the diffusion plate 105, and it is possible to make the flow rate of the air ejected from the air ejection holes 15 substantially uniform.

Although the air supply port 28 is formed on the top wall of the air chamber 22 in the first to fourth embodiments, a location of the air supply port 28 is not limited to this, but can be a surface of a side wall. In this case, it is necessary to appropriately adjust an arrangement position of the diffusion plate to intervene between the air supply port 28 and the air ejection holes 15.

As described above, the ship-body frictional resistance reducing device is useful for a ship-body frictional resistance reducing device having a plurality of air ejection holes formed on a ship's bottom and particularly useful when air is ejected from a plurality of air ejection holes in a uniform manner.

The invention claimed is:

1. A ship-body frictional resistance reducing device for reducing frictional resistance of a sailing ship body by forming an air bubble curtain on a bottom of the ship body by generating air bubbles, the device comprising:
    an air chamber disposed on the bottom of the ship body and being inside the ship body, the air chamber including an air supply port disposed thereon;
    a plurality of air ejection holes in an array on the bottom of the ship body, the plurality of air ejection holes disposed on a bottom of the air chamber so as to form an array; and
    a diffusion plate disposed inside the air chamber, the diffusion plate intervening between the air supply port and the air ejection holes, wherein
    the diffusion plate includes at least a supply-port facing area covering the air supply port, and first and second ejection-hole facing areas covering first and second air ejection holes of the plurality of air ejection holes, respectively, the first and second air ejection holes being disposed at first and second edges of the array of the plurality of air ejection holes, respectively.

2. The ship-body frictional resistance reducing device according to claim 1, wherein
    the diffusion plate is a rectangular plate and the first and second ejection hole facing areas are part of a whole ejection-holes facing area covering all the plurality of air ejection holes, and
    a diffusion opening extending in an arrangement direction of the array of the plurality of air ejection holes in a continuous manner is disposed between the diffusion plate and an inner wall of the air chamber inside the air chamber.

3. The ship-body frictional resistance reducing device according to claim 1, wherein four diffusion openings are disposed between the diffusion plate and inner walls of the air chamber inside the air chamber.

4. The ship-body frictional resistance reducing device according to claim 1, wherein
    the diffusion plate includes a center rectangular plate and first and second side rectangular plates, the center plate including the supply-port facing area, and the first and second side rectangular plates include the first and second ejection-hole facing areas, respectively, and
    a first diffusion opening is disposed between the center rectangular plate and the first side rectangular plate inside the air chamber, and a second diffusion opening is disposed between the center rectangular plate and the second side rectangular plate inside the air chamber.

* * * * *